US008557426B2

(12) United States Patent
Lee et al.

(10) Patent No.: US 8,557,426 B2
(45) Date of Patent: Oct. 15, 2013

(54) VACUUM-SEALING-TYPE FLEXIBLE-FILM PRIMARY BATTERY

(75) Inventors: Young Gi Lee, Daejeon (KR); Kwang Man Kim, Daejeon (KR); Min Gyu Choi, Daejeon (KR); Sang Hyo Lee, Nonsan (KR); Jong Dae Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 353 days.

(21) Appl. No.: 12/708,807

(22) Filed: Feb. 19, 2010

(65) Prior Publication Data
US 2011/0045337 A1 Feb. 24, 2011

(30) Foreign Application Priority Data

Aug. 19, 2009 (KR) .................. 10-2009-0076886
Oct. 15, 2009 (KR) .................. 10-2009-0098147

(51) Int. Cl.
*H01M 6/00* (2006.01)
*H01M 8/00* (2006.01)
*H01M 10/00* (2006.01)

(52) U.S. Cl.
USPC ..................................................... 429/127

(58) Field of Classification Search
USPC ............................... 429/127; 29/623.2
See application file for complete search history.

(56) References Cited

U.S. PATENT DOCUMENTS

| | | | | |
|---|---|---|---|---|
| 5,153,082 A * | 10/1992 | Ogino et al. | ............... | 429/231.4 |
| 5,637,418 A | 6/1997 | Brown et al. | | |
| 5,645,960 A * | 7/1997 | Scrosati et al. | ............... | 429/219 |
| 5,741,609 A * | 4/1998 | Chen et al. | ............... | 429/307 |
| 5,811,204 A | 9/1998 | Nitzan | | |
| 6,261,722 B1 * | 7/2001 | Dasgupta et al. | ............. | 429/304 |

(Continued)

FOREIGN PATENT DOCUMENTS

| | | |
|---|---|---|
| CN | 1314008 A | 9/2001 |
| EP | 1 102 336 A1 | 5/2001 |

(Continued)

OTHER PUBLICATIONS

Uwe Köhler et al., "Advances in alkaline batteries," Journal of Power Sources, 2004, pp. 45-52, vol. 127, 2003 Elsevier B.V., Hanover, Germany.

(Continued)

*Primary Examiner* — Carlos Barcena

(57) ABSTRACT

Provided are a vacuum-sealing-type flexible-film primary battery and a method of manufacturing the same. The primary battery includes a battery assembly comprising a positive electrode plate including a positive electrode collector having a first conductive carbon layer disposed directly on a surface-treated inner surface of a first pouch and a positive electrode layer disposed on the first conductive carbon layer of the positive electrode collector, a negative electrode plate including a negative electrode collector having a second conductive carbon layer disposed directly on a surface-treated inner surface of a second pouch and a negative electrode layer disposed on the second conductive carbon layer of the negative electrode collector, and an adhesion/post-injection polymer electrolyte layer interposed between the positive electrode plate and the negative electrode plate, wherein the battery assembly is completely sealed. The flexible-film primary battery may employ the pouch as a collector film to improve flexibility. Also, the flexible-film primary battery may be completely sealed using the pouch to improve a retention period and cell performance. Furthermore, the flexible-film primary battery may be manufactured using a screen printing technique, thereby facilitating a roll-to-roll sequential process.

14 Claims, 7 Drawing Sheets

(56) References Cited

U.S. PATENT DOCUMENTS

| | | | |
|---|---|---|---|
| 6,727,021 B1 * | 4/2004 | Shiota et al. | 429/232 |
| 7,285,334 B1 * | 10/2007 | Yamashita et al. | 428/458 |
| 7,285,359 B2 * | 10/2007 | Yamamoto et al. | 429/231.95 |
| 2005/0260492 A1 | 11/2005 | Tucholski et al. | |
| 2007/0037060 A1 | 2/2007 | Lee et al. | |

FOREIGN PATENT DOCUMENTS

| | | |
|---|---|---|
| KR | 1019910005509 B1 | 3/1991 |
| KR | 10-0245575 B1 | 11/1999 |
| KR | 20-0193473 Y1 | 6/2000 |
| KR | 1020010013653 A | 2/2001 |
| KR | 1020010104136 A | 11/2001 |
| KR | 1020090054631 A | 6/2009 |

OTHER PUBLICATIONS

N. Vassal et al., "Electrochemical properties of an alkaline solid polymer electrolyte based on P(ECH-co-EO)," Electrochimica Acta, 2000, pp. 1527-1532, vol. 45, 2000 Elsevier Science Ltd., Paris, France.

* cited by examiner

VACUUM-SEALING-TYPE FLEXIBLE-FILM PRIMARY BATTERY

CROSS-REFERENCE TO RELATED APPLICATION

This application claims priority to and the benefit of Korean Patent Application Nos. 10-2009-0076886, filed Aug. 19, 2009 and 10-2009-0098147 filed Oct. 15, 2009, the disclosure of which are incorporated herein by reference in its entirety.

BACKGROUND

1. Field of the Invention

The present invention relates to a vacuum-sealing-type flexible-film primary battery and a method of manufacturing the same, and more specifically, to a vacuum-sealing-type flexible-film primary battery, which uses a pouch as a collector substrate and employs a non-metal terminal technique, and a method of manufacturing the primary battery.

2. Discussion of Related Art

In recent years, a vast amount of research has been conducted on active radio frequency identification (RFID) tag technology. It is expected that the active RFID tag technology, which has a far-reaching influence on a wide variety of fields including digital TVs, home networks, and intelligent robots, will be highlighted as the next-generation essential industry that will surpass current code division multiple access (CDMA) technology. In other words, unlike a conventional passive technique of reading information stored in a tag using a reader, the active RFID tag technology may not only lead to a remarkable increase in a tag recognition distance but also enable sensing of information on objects and environments around a tag. Ultimately, it is expected that the active RFID tag technology will expand an information flow region from communication between a human being and an object via networking to communication between objects.

In order to drive an RFID tag, it is important to secure an internal power source completely separated from a reader. In this case, the internal power source may use a power device appropriate for the RFID tag, which is compact and lightweight and has a long lifespan. Also, a tag coverage may be expanded from a pallet level corresponding to a load transportation unit to an item level corresponding to each product. Considering that an applied tag is discarded after its original object is achieved, it would be most appropriate to apply a primary battery to the tag. Up to now, a film-type primary battery has partially been applied to an RFID tag and recognized as a useful power device.

Meanwhile, more attention has lately been paid to flexible devices. Flexible ubiquitous terminals, such as scroll-type displays, e-papers, flexible liquid crystal displays (LCDs), flexible organic light emitting diodes (OLEDs), and wearable personal computers (PCs), have lately been put to practical use, so that the demand for flexible power devices has now begun to intensify.

Even if flexible power devices are repeatedly bent, the flexible power devices should be free from any cracks in an electrode plate, separation between an electrode and an electrolyte, or separation between a collector and the electrode. Thus, to ductilize the collector, the collector should be formed of a material which is capable of improving the ductility of the collector, rather than a metal. Also, the electrode plate should be easily formed on the ductilized collector, and a completed battery should be structurally stable to effectively resist to bending or folding. Moreover, manufacture of flexible power devices should be simple using equipment that facilitates performing sequential processes.

A conventional film-type primary battery is a film-type 1.5V manganese (Mn) battery in which an electrode and an electrolyte have the same configuration as a typical dry battery and a container formed of a polyethylene terephthalate (PET) package material is used instead of a cylindrical can and laminated as a film type. However, although most polymer films may drop transmittance of moisture in a gas or air to a predetermined level or lower, it is impossible to completely cut off the transmittance of moisture in the gas or air. In the long run, this may result in leakage or dryness of the electrolyte contained in a cell. In addition, since most polymer films, except a polyolefin film, have low corrosion resistances to strong acids or strong bases, a direct contact of the polymer films with the electrolyte over a long period may lead to corrosion of the polymer films. These problems may detrimentally affect the durability, retention periods, and lifespans of film-type batteries, thereby greatly reducing the performances thereof.

Furthermore, as the function of tags evolves from a battery sustaining function into a sensor function, a sensor may be mounted on a tag so that a driving voltage of the tag may be increased to 3V. Thus, when conventional 1.5V film-type primary batteries are mounted on a tag, the 1.5V film-type primary batteries should be necessarily connected in series so that the volume of the batteries can be doubled in a limited space, thus reducing an energy density.

Meanwhile, in the field of lithium secondary batteries, a pouch formed of a sealed packing material has been proposed to increase a durability, a retention period and a lifespan. A typical pouch has a triple composite structure, which includes an outer layer formed of a nylon-based polymer film, an inner layer formed of a polypropylene (PP) polymer film, and an intermediate layer formed of aluminum (Al) foil inserted therebetween. Thus, the pouch may have high flexibility and such an appropriate mechanical strength as to maintain a predetermined shape. The inner layer of the pouch, which is formed of PP, may be highly corrosion-resistive to strong acids or strong bases, insoluble in any solvent, and melt only with heat. The intermediate layer formed of Al foil may function as a perfect barrier layer. Thus, a typical pouch used for a lithium secondary battery may serve as a sealed packing material in a final battery manufacturing process.

By use of the pouch having perfect gas/liquid blocking characteristics and good vacuum sealing and thermal fusion characteristics, a film-type battery with good durability and performance may be manufactured using a simple process. To do this, a conductive carbon layer should be directly coated on the surface of the pouch. Since the PP inner layer of the pouch has a low surface energy and a hydrophobic characteristic, the PP inner layer have a poor wettability in an organic solvent and have a poor coating characteristic, so that it is impossible to directly coat the conductive carbon layer on the PP inner layer. This is because the coated conductive carbon layer may be easily delaminated after a drying process and further delaminated when impregnated with an electrolyte. This is due to the fact that the PP inner layer of the pouch is neither compatible nor miscible with any polar polymer that is currently known as a binder of an electrode slurry.

A polymer electrolyte used for manufacture of a film-type battery should have good long-term stability because the polymer electrolyte requires a long lifespan of at least two years. In other words, components of the polymer electrolyte should be neither dried nor hardened for at least two years if possible to prevent sudden performance degradation.

Unlike in a conventional method in which electrode plates are laminated and wound to fabricate a cell, a film-type battery is manufactured by simply laminating positive and negative plates between which an electrolyte layer is inserted, thus causing separation or bad contact between the electrode plate and the electrolyte layer.

Furthermore, a thin film-type battery needs to be manufactured using a simple low-cost process because of its own properties. However, conventional manufacture of primary and secondary batteries may involve welding a metal terminal to an electrode plate, which is coated on metal foil, using ultrasonic waves and vacuum-packing a laminated cell component including an electrolyte. Accordingly, when the conventional manufacture of batteries is applied to the thin film-type battery, it is difficult to overcome high process costs due to a multi-stage manufacturing process and reduce the unit cost of production of the film-type batteries.

SUMMARY OF THE INVENTION

The present invention is directed to a flexible-film primary battery in which a pouch formed of a polymer-metal composite film, which completely cuts off transmission of external gases and moisture and has high corrosion resistance to an electrolyte, is surface-treated and used as a packing material and a collector in order to overcome corrosion of a polymer film, evaporation of the electrolyte due to an open cell structure, and degradation of retention period and cell performance.

Also, the present invention is directed to a method of manufacturing the above-described flexible-film primary battery.

One aspect of the present invention provides a flexible-film primary battery including a battery assembly comprising: a positive electrode plate including a positive electrode collector having a first conductive carbon layer disposed on a surface-treated inner surface of a first pouch and a positive electrode layer disposed on the first conductive carbon layer of the positive electrode collector; a negative electrode plate including a negative electrode collector having a second conductive carbon layer disposed on a surface-treated inner surface of a second pouch and a negative electrode layer disposed on the second conductive carbon layer of the negative electrode collector; and an adhesion/post-injection polymer electrolyte layer interposed between the positive electrode plate and the negative electrode plate, wherein the battery assembly is completely sealed.

Each of the pouches may be a metal/polymer composite layer including an outer layer, an intermediate layer, and an inner layer that have both a vacuum sealing characteristic and a thermal fusion characteristic. The outer layers of each of the pouches may be a polymer film formed to a thickness of about 5 to 50 μm using one selected from the group consisting of polyethylene terephthalate (PET), polybutylene terephthalate (PBT), nylon, high-density polyethylene (HDPE), oriented polypropylene (o-PP), polyvinyl chloride (PVC), polyimide (PI), polysulfone (PSU), and a combination thereof. The intermediate layers of each of the pouches may be a metal layer formed to a thickness of about 5 to 50 μm using one selected from the group consisting of aluminum (Al), copper (Cu), stainless steel (SUS), and an alloy thereof. The inner layers of each of the pouches may be a polymer film formed to a thickness of about 5 to 50 μm using one selected from the group consisting of cast polypropylene (c-PP), polyethylene (PE), ethylene vinylacetate (EVA), and a combination thereof.

The inner surfaces of each of the pouches may be surface-treated in order to overcome low surface energy and hydrophobic characteristics to facilitate formation of a subsequent layer. The surface-treatment may be a hydrophilic surface treatment selected from the group consisting of a corona discharge treatment using plasma, a flaming process, formation of a silicate ($SiO_2$) layer, and formation of an oxide coating layer.

Each of the conductive carbon layers may be formed of a conductive carbon and a polymer binder. The conductive carbon may be one selected from the group consisting of graphite, carbon black, acetylene black, and ketjen black. The polymer binder may be one selected from the group consisting of polyvinylidene fluoride (PVDF), a vinylidene fluoride-hexafluoropropylene (HFP) copolymer, polyvinyl chloride (PVC), cellulose, ethylcellulose, carboxymethylcellulose (CMC), polyethylene (PE), polypropylene (PP), ethylvinyl acetate (EVA), and polyvinyl alcohol.

The positive electrode layer may include: a positive electrode active material selected from manganese dioxide ($MnO_2$) and vanadium oxide; a conductive material selected from the group consisting of graphite, super-P, carbon black, acetylene black, denka black, ketjen black, and Lonza carbon; and a binder selected from the group consisting of PVDF, vinylidene fluoride-HFP copolymer, PVC, polyvinyl alcohol, polyvinyl acetate, EVA, CMC, and a mixture of styrene, butadiene rubber and carboxymethylcellulose.

The negative electrode layer may include lithium foil. Alternatively, the negative electrode layer may include: a negative electrode active material formed of zinc (Zn); a conductive material selected from the group consisting of graphite, super-P, carbon black, acetylene black, denka black, ketjen black, and Lonza carbon and a binder selected from the group consisting of PVDF, a vinylidene fluoride-HFP copolymer, PVC, polyvinyl alcohol, polyvinyl acetate, EVA, CMC, and a mixture of styrene, butadiene rubber and carboxymethylcellulose.

The adhesion/post-injection polymer electrolyte layer is a triple composite film, which includes a porous polymer matrix; and polymer layers coated on both sides of the porous polymer matrix and configured to become adhesive when impregnated with an electrolyte. The porous polymer matrix may be one selected from the group consisting of liner paper, nonwoven, a cellophane film, and a combination thereof. Alternatively, the porous polymer matrix may be one selected from the group consisting of PVC derivatives, polyacrylonitrile derivatives, polyacrylic acid, cellulose, ethylcellulose, carboxymethylcellulose, and a combination of at least two thereof.

The polymer layer coated on both sides of the porous polymer matrix may be formed of one selected from the group consisting of polyacrylic acid, cellulose, carboxymethylcellulose, polyvinyl alcohol, and a combination thereof. Alternatively, the polymer layer coated on both sides of the porous polymer matrix may be formed of one selected from the group consisting of PVDF, a vinylidene fluoride-HFP copolymer, PVC, polyvinylidene chloride (PVDC), polyvinyl acetate, poly(methylmethacrylate) (PMMA), and a combination thereof.

The electrolyte may be an aqueous electrolyte or an organic electrolyte. The aqueous electrolyte may be formed of an ammonium chloride salt solution, a zinc chloride salt solution, or a potassium hydroxide salt solution, which is dissolved in distilled water. The organic electrolyte may be formed of a lithium salt dissolved in an organic solvent.

Another aspect of the present invention provides a method of manufacturing a flexible-film primary battery. The method includes forming a first conductive carbon layer on a surface treated inner surface of a first pouch film to form a positive electrode collector, and forming a positive electrode layer on the conductive carbon layer to form a positive electrode plate; forming a second conductive carbon layer on a surface treated inner surface of a second pouch film to form a negative electrode collector, and forming a negative electrode layer on the conductive carbon layer to form a negative electrode plate; inserting an adhesion/post-injection polymer electrolyte layer between the positive electrode plate and the negative electrode plate to manufacture a battery assembly; injecting an electrolyte into the polymer electrolyte layer of the battery assembly; and completely sealing the battery assembly to form the flexible-film primary battery.

Each of the pouch films constituting the positive and negative electrode collectors may have a portion that extends from one side of each of the pouch films and serves as a terminal. Each of the conductive carbon layers may be formed even on the portion serving as the terminal.

The inner surfaces of each of the pouch films may be treated using a hydrophilic surface treatment. The hydrophilic surface treatment may be performed using a corona discharge treatment using plasma, a flaming process, formation of a $SiO_2$ layer, or formation of an oxide coating layer.

The conductive carbon layers, the positive electrode layer, and the negative electrode layer may be formed using a screen printing process.

BRIEF DESCRIPTION OF THE DRAWINGS

The above and other features and advantages of the present invention will become more apparent to those of ordinary skill in the art by describing in detail exemplary embodiments thereof with reference to the attached drawings in which.

DETAILED DESCRIPTION OF EMBODIMENTS

The present invention will be described more fully hereinafter with reference to the accompanying drawings, in which exemplary embodiments of the invention are shown.

Figure 1A:
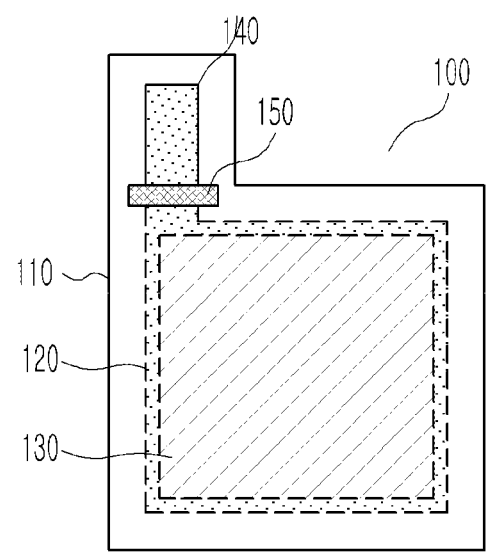
FIGS. 1A through 1D are plan views of a film primary battery according to an exemplary embodiment of the present invention.
Figure 1B:
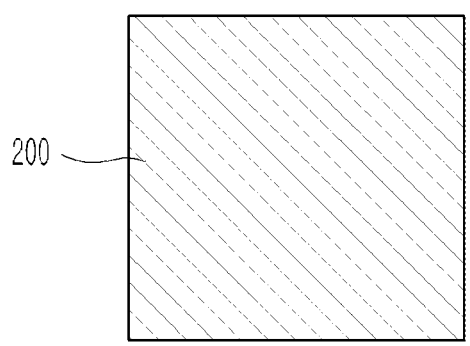
Figure 1C:
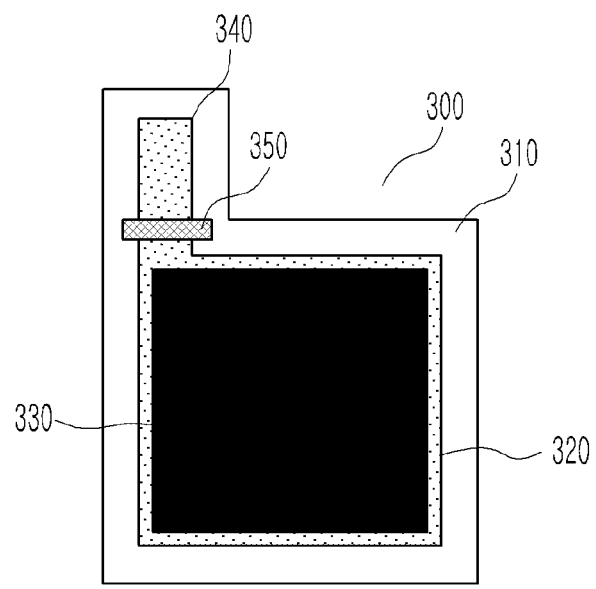
Figure 1D:
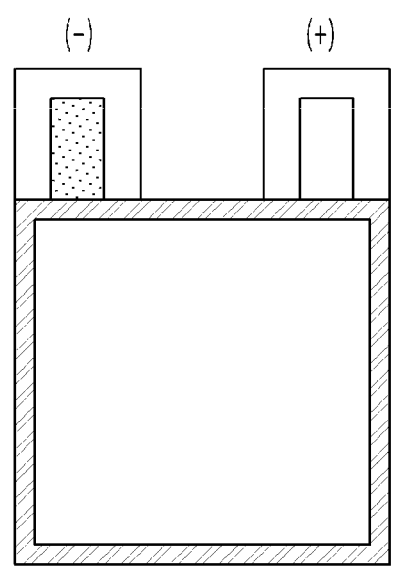
Figure 2:
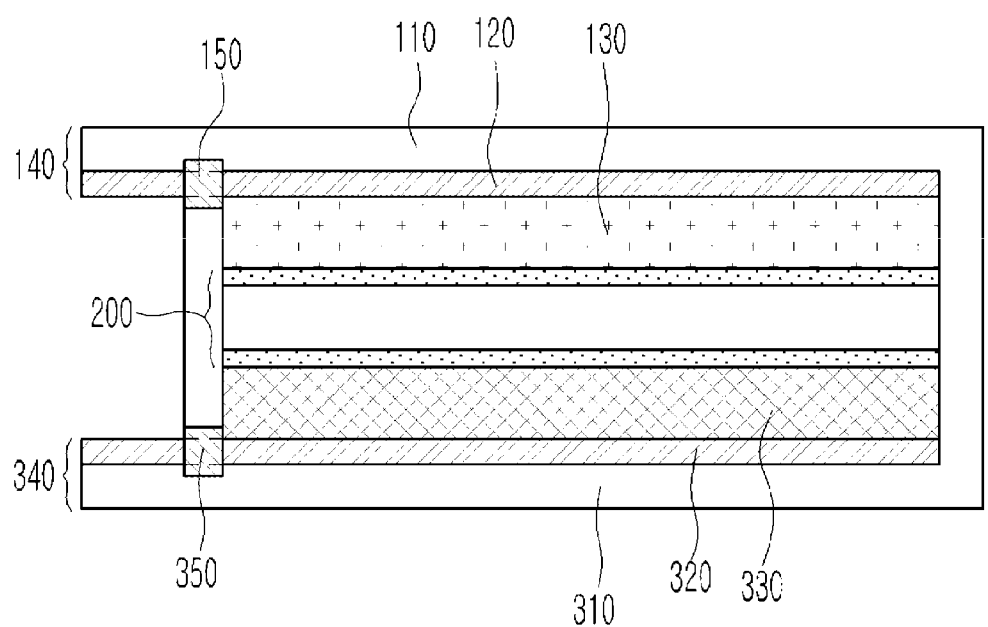
FIG. 2 is a cross-sectional view of the film primary battery of FIG. 1D.

FIGS. 1A through 1D are plan views of a flexible-film primary battery according to an exemplary embodiment of the present invention, and FIG. 2 is a cross-sectional view of the flexible-film primary battery of FIG. 1D.

Referring to FIGS. 1A through 1D, the flexible-film primary battery according to the exemplary embodiment of the present invention may have a pouch cell structure having four sides sealed under a vacuum condition using a thermal fusion technique. FIG. 1A is a plan view of a positive electrode plate 100 including a positive electrode collector having a conductive carbon layer 120 disposed on a surface-treated inner surface of a pouch 110 and a positive electrode layer 130 disposed on the conductive carbon layer 120. FIG. 1B is a plan view of an adhesion/post-injection polymer electrolyte layer 200. FIG. 1C is a plan view of a negative electrode plate 300 including a negative electrode collector having a conductive carbon layer 320 disposed on a surface-treated inner surface of a pouch 310 and a negative electrode layer 330 disposed on the conductive carbon layer 320. FIG. 1D is a plan view of a flexible-film primary battery in which the positive electrode plate 100 of FIG. 1A is disposed opposite the negative electrode plate 300 of FIG. 1B and the polymer electrolyte layer 200 is inserted between the positive electrode plate 100 and the negative electrode plate 300.

Thus, as shown in FIG. 2, which is a cross-sectional view of the flexible-film primary battery of FIG. 1D, the pouch 310, the conductive carbon layer 320, the negative electrode layer 330, the adhesion/post-injection polymer electrolyte layer 200, the positive electrode layer 130, the conductive carbon layer 120, and the pouch 110 may be sequentially laminated.

Each of the pouches 110 and 310 may include a metal/polymer composite layer including an outer layer, an intermediate layer, and an inner layer that have both vacuum sealing characteristics and thermal fusion characteristics.

More specifically, the outer layers of each of the pouches 110 and 310 may be polymer films formed to a thickness of about 5 to 50 μm using one selected from the group consisting of polyethylene terephthalate (PET), polybutylene terephthalate (PBT), nylon, high-density polyethylene (HDPE), oriented polypropylene (o-PP), polyvinyl chloride (PVC), polyimide (PI), polysulfone (PSU), and a combination thereof. The intermediate layers of each of the pouches 110 and 310 may be metal layers formed to a thickness of about 5 to 50 μm using one selected from the group consisting of aluminum (Al), copper (Cu), stainless steel (SUS), and an alloy thereof. Also, the inner layers of each of the pouches 110 and 310 may be polymer films formed to a thickness of about 5 to 50 μm using one selected from the group consisting of cast polypropylene (c-PP), polyethylene (PE), ethylene vinylacetate (EVA), and a combination thereof.

Since the inner surfaces of the pouches 110 and 310 have low surface energy and hydrophobic characteristics, the inner surfaces of the pouches 110 and 310 should be necessarily surface-treated to improve coating characteristics. In this case, the inner surfaces of the pouches 110 and 310 may be treated using a hydrophilic surface treatment. For example, the coating characteristics of the inner surfaces of the pouches 110 and 310 may be improved using various micro roughness techniques, such as a corona discharge treatment using plasma, a flaming process, formation of a silicate ($SiO_2$) layer, or formation of an oxide coating layer. As a result, the surface energy of the inner surfaces of the pouches 110 and 310 may be improved to about 60 dyne/cm (mN/m) or higher in case of measurements using test ink.

In the film-type lithium primary battery according to the exemplary embodiment of the present invention, the pouches 110 and 310 having the inner surfaces coated with the conductive carbon layers 120 and 320 may constitute the positive and negative collectors, respectively. Each of the conductive carbon layers 120 and 320 may include a conductive carbon and a polymer binder. The conductive carbon may be one selected from the group consisting of graphite, carbon black, acetylene black, and ketjen black. The polymer binder may be one selected from the group consisting of polyvinylidene fluoride (PVDF), a vinylidene fluoride-HFP copolymer, PVC, cellulose, ethylcellulose, carboxymethylcellulose, PE, PP, EVA, and polyvinyl alcohol.

Here, a ratio of the conductive carbon to the polymer binder may be within a range that is typically applicable in the art. For example, a weight ratio of the conductive carbon to the polymer binder may range from about 5:5 to 9.9:0.1.

In the positive electrode collector, the pouch 110 may have a thickness of about 50 to 180 μm, and the conductive carbon layer 120 may have a thickness of about 1 to 30 μm. The pouch 310 and the conductive carbon layer 320 of the negative electrode collector may have the same thickness ranges as the pouch 110 and the conductive carbon layer 120 of the positive electrode collector, respectively. When each of the pouches 110 and 310 has a smaller thickness than about 50 μm, each of the pouches 110 and 310 may have a poor vacuum sealing characteristic, while when each of the pouches 110 and 310 has a greater thickness than about 180 μm, each of the pouches 110 and 310 may have a poor flexible film characteristic. Also, when each of the conductive carbon layers 120 and 320 has a smaller thickness than about 1 μm, the resistance of each of the conductive carbon layers 120 and 320 may increase, while when each of the conductive carbon layers 120 and 320 has a greater thickness than about 30 μm, each of the conductive carbon layers 120 and 320 may be inflexible.

The positive and negative electrode collectors may have positive and negative electrode terminals 140 and 340, respectively. The positive and negative electrode terminals 140 and 340 may not be tabbed but may correspond to non-metallic terminals obtained by extending the pouches 110 and 310 in terminal types and coating extensions of the pouches 110 and 310 with the conductive carbon layers 120 and 320, respectively.

Meanwhile, since the positive and negative electrode terminals 140 and 340 extend from the pouches 110 and 310 and are coated with the conductive carbon layers 120 and 320, respectively, portions of the pouches 110 and 310 on which the conductive carbon layers 120 and 320 are formed may be incompletely sealed during a subsequent thermal fusion process for completely sealing the flexible-film primary battery. Accordingly, hot melting films 150 and 350 may be further placed on or fused into the portions of the pouches 110 and 310, respectively, thereby enhancing a vacuum sealing state. The hot melting films 150 and 350 may be formed of EVA.

The positive electrode layer 130 may be formed by coating the conductive carbon layer 120 of the positive electrode collector with a positive electrode material including a positive electrode active material, a conductive material, and a binder. Specifically, the positive electrode active material may be selected from manganese dioxide ($MnO_2$) and vanadium oxide. Here, the oxide may have a grain size of about 10 to 100 μm. The conductive material of the positive electrode material may be one selected from the group consisting of graphite, super-P, carbon black, acetylene black, denka black, ketjen black, and Lonza carbon. The binder of the positive electrode material may be one selected from the group consisting of PVDF, a vinylidene fluoride-HFP copolymer, PVC, polyvinyl alcohol, polyvinyl acetate, ethylvinyl acetate, carboxymethylcellulose, and a mixture of styrene butadiene rubber (SBR) and carboxymethylcellulose. A ratio of the positive electrode active material, the conductive material, and the binder that constitute the positive electrode layer 130 may be within a range that is typically applicable in the art. For example, a weight ratio of the positive electrode active material, the conductive material, and the binder may range from 7:1.5:1.5 to 9.8:0.1:0.1.

The positive electrode layer 130, which is formed on only one side of the positive electrode collector to constitute a one-side positive electrode plate 100, may have a thickness of about 30 to 150 μm. When the positive electrode layer 130 has a smaller thickness than about 30 μm, the capacity and energy density of the primary battery may be excessively reduced, while when the positive electrode layer 130 has a greater thickness than about 150 μm, the positive electrode layer 130 may be inflexible.

When the primary battery is a 3V cell, the negative electrode layer 330 formed on the conductive carbon layer 320 of the negative electrode collector may be lithium (Li) foil, which is simply compressed and bonded onto the conductive carbon layer 320. When the primary battery is a 1.5V cell, the negative electrode layer 330 may be formed by coating the conductive carbon layer 320 with a negative electrode material including a negative electrode active material, a conductive material, and a binder. Specifically, the negative electrode active material may be zinc (Zn), and the conductive material of the negative electrode material may be one selected from the group consisting of graphite, super-P, carbon black, acetylene black, denka black, ketjen black, and Lonza carbon. The binder of the negative electrode material may be one selected from the group consisting of PVDF, a vinylidene fluoride-HFP copolymer, PVC, polyvinyl alcohol, polyvinyl acetate, ethylvinyl acetate, carboxymethylcellulose, and a mixture of styrene, butadiene rubber and carboxymethylcellulose. A ratio of the negative electrode active material, the conductive material, and the binder may be within a range that is typically applicable in the art. For example, a weight ratio of the negative electrode active material, the conductive material, and the binder may range from 7:1.5:1.5 to 9.8:0.1:0.1.

The negative electrode layer 330, which is formed on only one side of the negative electrode collector to constitute a one-side negative electrode plate 300, may have a thickness of about 15 to 150 μm. When the negative electrode layer 330 has a smaller thickness than about 15 μm, the capacity and energy density of the primary battery may be excessively reduced, while when the negative electrode layer 330 has a greater thickness than about 150 μm, the negative electrode layer 330 may be inflexible.

The adhesion/post-injection polymer electrolyte layer 200 of FIG. 1B may be inserted between the positive electrode plate 100 of FIG. 1A and the negative electrode plate 300 of FIG. 1C. The adhesion/post-injection polymer electrolyte layer 200 may be a triple composite film, which may include a porous polymer matrix and polymer layers, which are coated on both sides of the porous polymer matrix and configured to become adhesive when impregnated with an electrolyte. The porous polymer matrix, which has high mechanical strength and a porous structure, may facilitate rapid impregnation of the electrolyte. Also, the polymer layers coated on both sides of the porous polymer matrix may turn viscous during the impregnation of the electrolyte to coat polymers that become more adhesive to electrodes. Although the polymer electrolyte layer 200 is a multiple film having no adhesive property before the electrolyte is impregnated, when the polymer electrolyte layer 200 is impregnated with the electrolyte, the electrolyte may penetrate so that the electrolyte is penetrated into pores of the intermediate film, and both the films may be impregnated with the electrolyte, swell, become structurally flexible, and turn into adhesive layers. In this case, the electrolyte may uniformly spread into an electrolyte region so that the electrolyte region may be activated into a polymer electrolyte ion conductor.

The porous polymer matrix may be one selected from the group consisting of liner paper, a nonwoven, a cellophane film, and a combination thereof. In this case, the polymer layers coated on both sides of the porous polymer matrix may be formed of one selected from the group consisting of polyacrylic acid, cellulose, carboxymethylcellulose, polyvinyl alcohol, and a combination thereof.

Also, the porous polymer matrix may be formed of a flame-resistant material having a self-extinguishing function to quickly break a contact of a combustible with oxygen during combustion. For example, the porous polymer matrix may be formed of PVC derivatives, polyacrylonitrile derivatives, polyacrylic acid, cellulose, ethylcellulose, carboxymethylcellulose, or a mixture or copolymer formed of a combination of at least two thereof. For example, the PVC derivatives may be PVC, PVDC, and so on, and the polyacrylonitrile derivatives may be one selected from the group consisting of polyacrylonitrile, polymethacrylonitrile, an acrylonitrile-methylmethacrylate copolymer, and a methacrylonitrile-methylmethacrylate copolymer. In this case, the polymer layers coated on both sides of the porous polymer matrix may be formed of one selected from the group consisting of PVDF, a vinylidene fluoride-HFP copolymer, PVC, polyvinylidene chloride (PVDC), polyvinyl acetate (PVA), poly(methylmethacrylate) (PMMA), and a combination thereof.

The electrolyte, which is injected after the bonding of the polymer electrolyte layer 200, may be formed of an aqueous electrolyte or an organic electrolyte. The aqueous electrolyte may be prepared by dissolving an ammonium chloride salt, a zinc chloride salt, or a potassium hydroxide salt in distilled water, or an organic electrolyte may be prepared by dissolving a lithium salt in an organic solvent. The lithium salt contained in the electrolyte may be one selected from the group consisting of lithium perchlorate ($LiClO_4$), lithium triflate ($LiCF_3SO_3$), lithium hexafluorophosphate ($LiPF_6$), lithium tetrafluoroborate ($LiBF_4$), lithium trifluoromethane sulfonimide ($LiN(CF_3SO_2)_2$), and a combination thereof. The organic solvent may be one selected from the group consisting of ethylene carbonate, dimethyl carbonate, diethyl carbonate, ethylmethyl carbonate, dimethyl formamide, tetrahydrofurane, dimethyl acetylamide, n-butyl carbitol, n-methylpyrrolidone, 1,3-dioxolane, dimethylether, diethylether, dimethyl sulfoxide, and a combination thereof.

FIG. 1D is a plan view of the film-type primary battery in which the positive electrode plate 100 of FIG. 1A and the negative electrode plate 300 of FIG. 1C between which the adhesion/post-injection polymer electrolyte layer 200 of FIG. 1B is inserted are disposed opposite each other, laminated, and sealed. When the pouches 110 and 310 of the positive and negative electrode plates 100 and 300 are brought into contact with each other to allow corners of the pouches 110 and 310 to correspond to each other, the coated surfaces of the positive and negative electrode terminals 140 and 340 are disposed opposite each other. The positive and negative electrodes terminals 140 and 340 may be formed during formation of the conductive carbon layers 120 and 320 and exposed outside the pouches 110 and 310.

Hereinafter, a method of manufacturing the flexible-film primary battery of FIG. 1D according to an exemplary embodiment of the present invention will be described with reference to FIG. 3.

Figure 3:
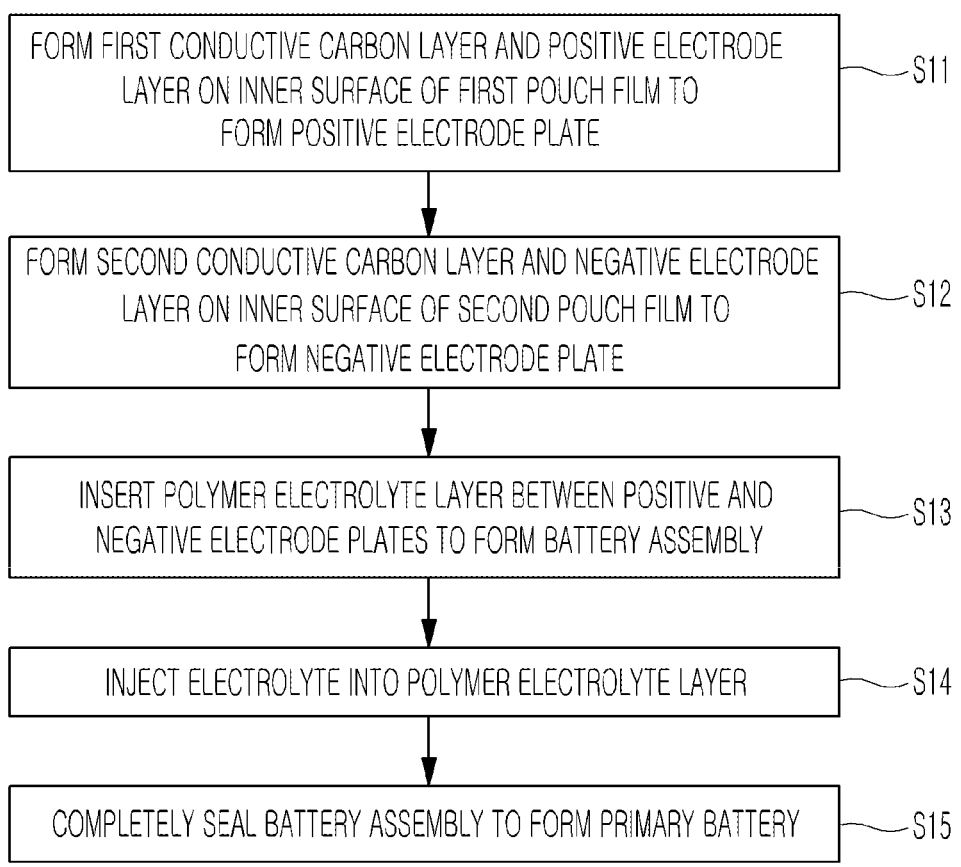
FIG. 3 is a flowchart illustrating a method of manufacturing a film primary battery according to an exemplary embodiment of the present invention.

FIG. 3 is a flowchart illustrating a method of manufacturing a flexible-film primary battery according to an exemplary embodiment of the present invention.

Referring to FIG. 3, the method of manufacturing a flexible-film primary battery according to the exemplary embodiment of the present invention may include forming a first conductive carbon layer on a surface-treated inner surface of a first pouch film to form a positive electrode collector and forming a positive electrode layer on the first conductive carbon layer to form a positive electrode plate (step S11); forming a second conductive carbon layer on a surface-treated inner surface of a second pouch film to form a negative electrode collector and forming a negative electrode layer on the second conductive carbon layer to form a negative electrode plate (step S12); inserting an adhesion/post-injection polymer electrolyte layer between the positive electrode plate and the negative electrode plate to form a battery assembly in which the negative electrode plate, the adhesion/post-injection polymer electrolyte layer, and the positive electrode plate are laminated (step S13); injecting an electrolyte into the adhesion/post-injection polymer electrolyte layer (step S14); and completely sealing the battery assembly to form the primary battery (step S15).

In step S11, before the first conductive carbon layer is formed, the surface-treated inner surface of the first pouch film may be treated using a hydrophilic surface treatment, thereby facilitating the formation of the first conductive carbon layer on the surface-treated inner surface of the first pouch film.

The hydrophilic surface treatment may be performed using various techniques, such as a corona discharge treatment using plasma, a flaming process, formation of a silicate ($SiO_2$) layer, or formation of an oxide coating layer.

In step S11, the first conductive carbon layer may be coated using a screen printing process. In this case, the first conductive carbon layer may be coated even on an electrode terminal using a one-time screen printing process, thereby forming the positive electrode collector. Similarly, the positive electrode layer may be coated on the first conductive carbon layer using a screen printing process. The positive electrode layer may be formed to a thickness of about 30 to 150 μm.

In step S12, as in step S11, the inner surface of the second pouch film may be treated using a hydrophilic surface treatment, thereby facilitating the formation of the second conductive carbon layer on the surface-treated inner surface of the second pouch film.

In step S12, the second conductive carbon layer may be coated using a screen printing process. In this case, the second conductive carbon layer may be coated even on an electrode terminal using a one-time screen printing process, thereby forming the negative electrode collector. Similarly, the negative electrode layer may be coated on the second conductive carbon layer using a screen printing process. The negative electrode layer may be formed to a thickness of about 15 to 150 μm.

Although it is exemplarily illustrated that each of the positive and negative electrode plates is formed using a screen printing process, the present invention is not limited thereto. For instance, the conductive carbon layers and the positive and negative electrode layers may be coated using a slurry coating process of coating a liquid using a coater, a spray coating process of spraying a solution, or an inkjet printing process using an inkjet head.

In step S13, the facing inner surfaces of the pouch films of the battery assembly, on which no electrode terminal is formed, may be sealed under a vacuum condition using a thermal fusion process. Specifically, the facing inner surfaces of the pouch films of the battery assembly, on which no electrode terminal is formed, may be fused by applying heat at a temperature of about 100° C. or higher under a reduced pressure.

For example, the polymer electrolyte layer may be a triple composite film obtained by dissolving a polymer matrix, which is highly compatible with the electrolyte, in a co-solvent, mixing the polymer matrix dissolved in the co-solvent with an inorganic additive, coating both sides of the porous polymer matrix with the resulting slurry, and drying the coated slurry.

Thereafter, in step S14, the electrolyte may be injected into the polymer electrolyte layer, so that the polymer electrolyte layer may be plasticized, and a portion of the polymer electrolyte layer that contacts the electrolyte may become adhesive.

Thereafter, in step S15, the battery assembly may be completely sealed, thereby manufacturing the primary battery. In this case, even the positive and negative electrode terminals may be sealed under a vacuum condition using a thermal fusion process, thereby forming a complete-sealing-type primary battery. In this case, since the conductive carbon layer is formed on the positive and negative terminals, a sealing state of the primary battery may be weakened. Accordingly, hot melting films may be further placed on or fused into the positive and negative electrode terminals, respectively, thereby enhancing a vacuum sealing state.

The flexible-film primary battery manufactured using the above-described process may maximize a capacity and energy density in a limited cell space, have the entire thickness of 1 mm or less, and be capable of being freely bent. Also, a polymer electrolyte layer including an adhesion/post-injection polymer matrix may be used to markedly improve cell safety. Furthermore, the method of the present invention may adopt a roll-to-roll process using a conventional screen printing process, thereby facilitating automation, sequential fabrication, and mass production and reducing manufacturing costs.

Hereinafter, a method of manufacturing a film-type primary battery according to the present invention will be described in further detail with reference to specific manufacturing examples. However, the following manufacturing examples are provided only for brevity and the invention should not be construed as limited to the manufacturing examples set forth therein. Therefore, it will be understood that various changes in form and details may be made in the following manufacturing examples without departing from the spirit and scope of the present invention.

Embodiment 1

Manufacture of 1.5V Film-Type Manganese (Mn) Primary Battery

An inner layer was formed of cast polypropylene (c-PP) to a thickness of about 35 μm, an outer layer was formed of nylon to a thickness of about 15 μm, and 30 μm-thick aluminum (Al) foil was inserted between the inner and outer layers. The inner layer, the Al foil, and the outer layer were laminated to form a 75 μm-thick Al pouch. An inner surface of the Al pouch was hydrophilic-treated using a corona discharger in an atmospheric environment until a surface energy reached about 50 dyne/cm or higher. The hydrophilic-treated inner surface of the Al pouch lost its peculiar gloss and became rough. It could be confirmed that when drops of water fell on the surface-treated inner surface of the Al pouch, they did not stand but spread out to facilitate formation of a coating layer.

Jelly-like highly viscous carbon paste, which was manufactured by dissolving 5% by weight PVDF in N-methyl pyrrolidone (NMP) and adding 95% by weight graphite, was coated on the surface-treated inner surface of the Al pouch using a screen printer, thereby forming a positive electrode collector. After the screen printing process, a dried conductive carbon layer had a thickness of about 20 mm and an area of 4.3 cm×4.3 cm. In this case, not only a current collecting area but also a lead line with a width of about 0.8 cm and a length of 2.5 cm were coated with the conductive carbon layer at once. Subsequently, the lead line served as positive and negative electrode terminals after completion of a final cell.

A mixture was obtained by mixing an SBR emulsion with 3% by weight carboxymethylcellulose (CMC) dissolved in distilled water in a weight ratio of 1:1, and then mixed with 90% by weight electrochemically synthesized electrolytic manganese oxide (EMD) (functioning as a positive electrode active material), 5% by weight graphite (functioning as a conductive material), and 5% by weight SBR/CMC (functioning as a binder) based on the total weight of the co-solvent, thereby forming a slurry. The slurry was coated on the conductive carbon layer to form a one-side oxide positive electrode plate to a thickness of about 100 μm.

In order to form a negative electrode plate, like the positive electrode plate, a conductive carbon layer was formed on the inner layer of the pouch to form a negative electrode collector. Thereafter, a mixture was obtained by mixing an SBR emulsion with 3% by weight CMC dissolved in distilled water in a weight ratio of 1:1, and then mixed with 90% by weight Zn powder having an average diameter of about 75 μm or less (functioning as a negative electrode active material), 5% by weight graphite (functioning as a conductive material), and 5% by weight SBR/CMC (functioning as a binder) based on the total weight of the co-solvent, thereby forming a slurry. The slurry was coated on the conductive carbon layer to form a one-side negative electrode plate to a thickness of about 50 μm.

In order to form an adhesion/post-injection polymer electrolyte layer, a polyacrylic acid was dissolved in distilled water, and 15% by weight hydrophobic silica based on the total weight of a polymer matrix was added, and a mixture was coated on a nonwoven to a thickness of about 15 μm or more, thereby forming a triple composite layer. The adhesion/post-injection polymer electrolyte layer having a triple structure was inserted between the positive and negative electrode plates, and ends of first through third sides other than a fourth side having the positive and negative electrodes terminals were bonded to one another using a thermal fusion process. Afterwards, a 1 mL aqueous electrolyte obtained by dissolving a 3M ammonium chloride salt in distilled water was injected, and the remaining fourth side having the positive and negative electrode terminals was fused and bonded under a vacuum compressed-bonding condition, thereby completing manufacture of a sealing-type film primary battery. In this case, since a sealing state of portions of the fourth side on which the conductive carbon layers were formed might weaken during the thermal fusion process, EVA films were further placed on the portions of the fourth side on which the carbon conductive layers were formed.

In this case, 3% by weight potassium dichromate (functioning as a depolarizer) was further added to the aqueous electrolyte. After the electrolyte was injected, the electrolyte permeated into the nonwoven and both the polymer coating layers so that the electrolyte was remained in the porous nonwoven, while both the coating layers formed of a polyacrylic acid were impregnated and activated into a highly adhesive electrolyte layer and remained in physical contact with the positive and negative electrode plates.

Embodiment 2

Manufacture of 3V Film-Type Lithium Primary Battery

Positive and negative electrode collectors were formed in the same manner as in Embodiment 1, and the positive electrode collector was coated with the same positive electrode active material as in Embodiment 1, thereby forming a positive electrode plate. However, to form a negative electrode plate, 50 μm-thick Li foil was cut to an area of 4.3 cm×4.3 cm, placed on the negative electrode collector, and bonded to the negative electrode collector under pressure.

Also, a polymer electrolyte layer was formed in the same manner as in Embodiment 1 except that a vinylidene fluoride-HFP copolymer was dissolved in an NMP co-solvent and 25% by weight hydrophobic silica based on the total weight of a polymer matrix was added, and the resulting solution was coated on both 16 μm-thick PE porous layers to a thickness of about 5 μm or more to form a triple composite layer. In this case, an electrolyte was injected and activated in the same manner as in Embodiment 1 except that the electrolyte was not an aqueous electrolyte but a 1M organic electrolyte obtained by dissolving a lithium hexafluorophosphate ($LiPF_6$) salt in a solvent prepared by mixing ethylene carbonate and dimethyl carbonante in a weight ratio of 1:1. As a result, manufacture of a 3V complete-sealing-type film primary battery was completed.

Comparative Examples

In order to analyze the lifespan, capacity, film thickness, and process simplicity of the 1.5V film-type primary battery and 3V film-type primary battery prepared by Embodiments 1 and 2, respectively, a 1.5V open-type film battery and a 3V pouch-type film battery in which conventional metal collectors were formed using each of Al and nickel (Ni) were manufactured. In this case, the 1.5V open-type film battery was manufactured under the same conditions except that the same positive and negative electrode plates as in Embodiment 1 were formed on a PET film instead of a pouch and four corners were not vacuum-sealed but sealed using an adhesive tape (Comparative example 1). The 3V pouch-type film battery was manufactured under the same conditions except that a pouch was used only as a packing material during a final vacuum sealing process, positive and negative electrode plates were formed by respectively coating Al and Cu foils with positive and negative electrode layers formed of the same material and processed with Al and Ni tabs, respectively, using an ultrasonic welding machine, and a PE isolation layer was used as an electrolyte instead of an adhesive electrolyte, and the electrolyte was post-injected before the vacuum sealing process (Comparative example 2).

Comparison between Embodiments 1 and 2 with Comparative Examples 1 and 2

Figure 4:
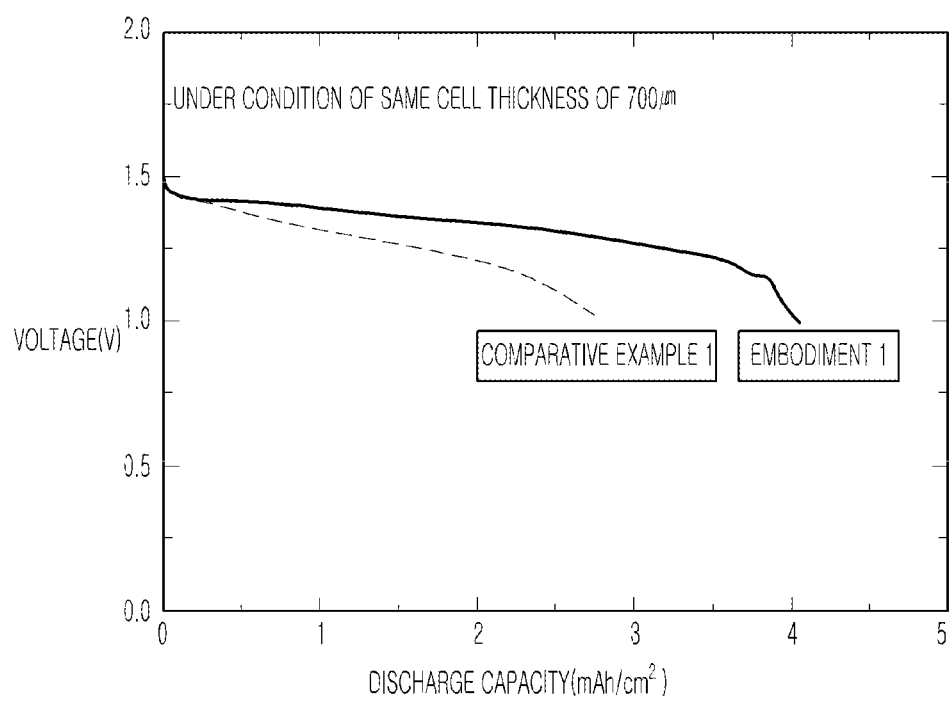
FIG. 4 is a graph of a voltage relative to a discharge capacity in a 1.5V complete-sealing-type film primary battery according to an exemplary Embodiment 1 of the present invention and a primary battery according to Comparative example 1.

A variation of voltage relative to discharge capacity of the 1.5V complete-sealing-type film primary battery of Embodiment 1 was compared with that of Comparative example 1 as shown in FIG. 4.

Referring to FIG. 4, the film-type primary battery of Embodiment 1 required an initial open-circuit voltage (OCV) of 1.5V and had a cell capacity of about 4.0 mAh/cm² or more when discharged to 1.0V under a current condition of C/10 (1 mA). That is, the film-type primary battery of Embodiment 1 had about 1.4 times the discharge capacity of the 1.5V open-type film primary battery of Comparative example 1, which had the same size and thickness as the primary battery of Embodiment 1.

Figure 5:
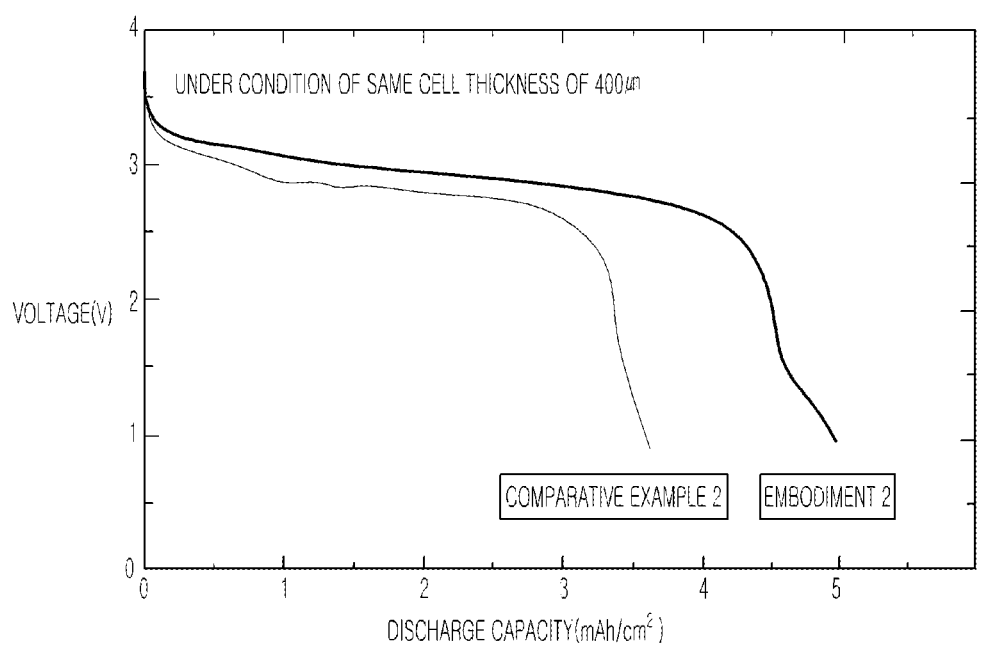
FIG. 5 is a graph of a voltage relative to a discharge capacity in a 3V complete-sealing-type film primary battery according to another exemplary Embodiment 2 of the present invention and a primary battery according to Comparative example 2.

A variation of voltage relative to discharge capacity of the 3V complete-sealing-type film primary battery of Embodiment 2 was compared with that of Comparative example 2 as shown in FIG. 5.

Referring to FIG. 5, the film-type primary battery of Embodiment 2 required an initial OCV of 3.7V and had a cell capacity of about 5.0 mAh/cm² or more when discharged to 2.0V under a current condition of C/10 (1 mA). That is, the film-type primary battery of Embodiment 2 had about 1.5 times the discharge capacity of the 3V pouch-type primary battery of Comparative example 2, which had the same size and thickness as the primary battery of Embodiment 2.

Figure 6:
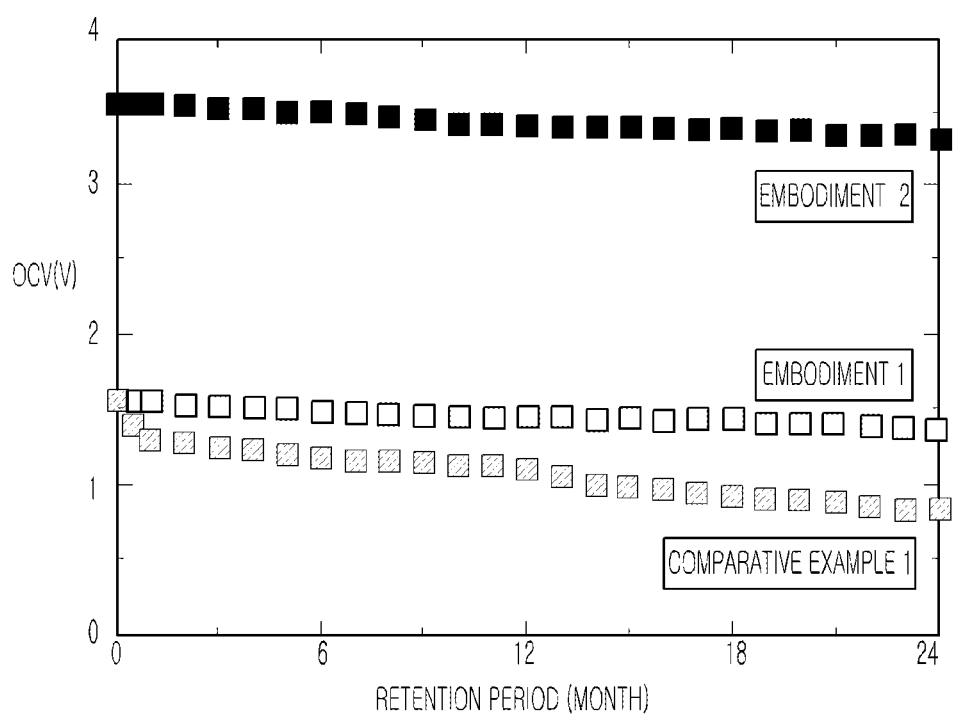
FIG. 6 is a graph showing comparison of retention periods of film primary batteries according to the exemplary Embodiments 1 & 2 and Comparative example 1.

In order to analyze the retention periods of the film-type primary batteries of Embodiments 1 and 2, a variation of an OCV relative to time of each of the film-type primary batteries of Embodiments 1 and 2 was measured every month for 2 years and compared with that of Comparative example 1 as shown in FIG. 6.

Referring to FIG. 6, the OCV of each of the film-type primary batteries according to Embodiments 1 and 2 of the present invention were reduced by lower than 1% for 2 years. Thus, it can be confirmed that the film-type primary batteries of Embodiments 1 and 2 exhibited low self-discharge rates and good lifespan characteristics.

A flexible-film primary battery according to exemplary embodiments of the present invention may employ a pouch as a collector substrate to ensure flexibility and cut off transmission of gases and moisture, thereby enabling manufacture of a sealing-type film battery.

Also, a conductive layer and an electrode may be directly coated on a surface-treated pouch so that a cell can be completed during a final operation through a one-time roll-to-roll sequential process. In particular, inner layers of pouches may freely undergo a thermal fusion process in portions other than the electrode and the conductive layer, thereby facilitating manufacture of the film battery.

Furthermore, a flexible-film primary battery according to the present invention may employ a triple adhesion/post-injection layer including a porous core film, which is easily impregnated with an electrolyte, and polymer layers, which are coated on both sides of the porous core film to be highly adhesive to electrodes, thereby facilitating performing sequential processes.

A flexible-film primary battery may be freely embodied irrespective of a 1.5V battery or a 3V battery and employ a collector with a pouch so that a conductive carbon layer may be extended and used as a nonmetal terminal without forming or adding positive and negative metal terminals.

According to the present invention, a flexible-film primary battery can be simply sealed under a vacuum condition using a thermal fusion technique, thereby improving a retention period, a lifespan, and a safety characteristic.

In the drawings and specification, there have been disclosed typical exemplary embodiments of the invention and, although specific terms are employed, they are used in a generic and descriptive sense only and not for purposes of limitation. As for the scope of the invention, it is to be set forth in the following claims. Therefore, it will be understood by those of ordinary skill in the art that various changes in form and details may be made therein without departing from the spirit and scope of the present invention as defined by the following claims.

What is claimed is:

1. A flexible-film primary battery including a battery assembly comprising:
   a first pouch layer and a second pouch layer;
   a positive electrode plate including a positive electrode collector having a first conductive carbon layer disposed directly on a surface-treated inner surface of the first pouch layer, and a positive electrode layer disposed over the first conductive carbon layer;

a negative electrode plate including a negative electrode collector having a second conductive carbon layer disposed directly on a surface-treated inner surface of the second pouch layer, and a negative electrode layer disposed over the second conductive carbon layer; and an adhesion/post-injection polymer electrolyte layer disposed between the positive electrode plate and the negative electrode plate;

a positive terminal extending from the first pouch layer and coated with the first conductive carbon layer; and a negative terminal extending from the second pouch layer and coated with the second conductive carbon layer, wherein the battery assembly is completely sealed.

2. The primary battery of claim 1, wherein each of the first and second pouch layers include a metal/polymer composite layer including an outer layer, an intermediate layer, and an inner layer, and has both vacuum sealing and thermal fusion characteristics.

3. The primary battery of claim 2, wherein the outer layers of each of the first and second pouch layers are polymer films with a thickness of about 5 μm to about 50 μm and include any of polyethylene terephthalate (PET), polybutylene terephthalate (PBT), nylon, high-density polyethylene (HDPE), oriented polypropylene (o-PP), polyvinyl chloride (PVC), polyimide (PI), polysulfone (PSU), and a combination thereof, wherein the intermediate layers of each of the first and second pouch layers are metal layers with a thickness of about 5 μm to about 50 μm and include any of aluminum (Al), copper (Cu), stainless steel (SUS), and an alloy thereof, and wherein the inner layers of each of the first and second pouch layers are polymer films with a thickness of about 5 μm to about 50 μm and include any of cast polypropylene (c-PP), polyethylene (PE), ethylene vinylacetate (EVA), and a combination thereof.

4. The primary battery of claim 1, wherein the inner surfaces of each of the first and second pouch layers are treated using a hydrophilic surface treatment.

5. The primary battery of claim 1, wherein each of the first and second conductive carbon layers comprises a conductive carbon including any of graphite and carbon black, and a polymer binder including any of polyvinylidene fluoride (PVDF), a vinylidene fluoride-hexafluoropropvlene (HFP) copolymer, PVC, cellulose, ethylcellulose, carboxymethylcellulose (CMC), PE, PP, EVA, and polyvinyl alcohol.

6. The primary battery of claim 1, wherein the positive electrode layer comprises:

a positive electrode active material selected from manganese dioxide ($MnO_2$) and vanadium oxide;

a conductive material including any of graphite and carbon black; and a binder including any of PVDF, a vinylidene fluoride-HFP copolymer, PVC, polyvinyl alcohol, polyvinyl acetate, EVA, CMC, and a combination of styrene, butadiene rubber and carboxymethylcellulose.

7. The primary battery of claim 1, wherein the negative electrode layer includes lithium foil.

8. The primary battery of claim 1, wherein the negative electrode layer comprises:

a negative electrode active material including zinc (Zn);

a conductive material including any of graphite and carbon black; and a binder including any of PVDF, a vinylidene fluoride-HFP copolymer, PVC, polyvinyl alcohol, polyvinyl acetate, EVA, CMC, and a combination of styrene, butadiene rubber and carboxymethylcellulose.

9. The primary battery of claim 1, wherein the adhesion/post-injection polymer electrolyte layer is a triple composite film including:

a porous polymer matrix; and polymer layers coated on both sides of the porous polymer matrix and configured to become adhesive when impregnated with an electrolyte.

10. The primary battery of claim 9, wherein the porous polymer matrix is selected from any of liner paper, a nonwoven, a cellophane film, and a combination thereof.

11. The primary battery of claim 10, wherein the polymer layer coated on both sides of the porous polymer matrix comprises any of polyacrylic acid, cellulose, carboxymethylcellulose, polyvinyl alcohol, and a combination thereof.

12. The primary battery of claim 9, wherein the porous polymer matrix is selected from any of PVC derivatives, polyacrylonitrile derivatives, polyacrylic acid, cellulose, ethylcellulose, carboxymethylcellulose, and a combination of at least two thereof.

13. The primary battery of claim 12, wherein the polymer layer coated on both sides of the porous polymer matrix comprises any of PVDF, a vinylidene fluoride HFP copolymer, PVC, polyvinylidene chloride (PVDC), polyvinyl acetate (PVA), poly(methylmethacrylate) (PMMA), and a combination thereof.

14. The primary battery of claim 9, wherein the electrolyte is an aqueous electrolyte formed by dissolving an ammonium chloride salt, a zinc chloride salt, or a potassium hydroxide salt in distilled water, or an organic electrolyte formed by dissolving a lithium salt in an organic solvent.

\* \* \* \* \*